June 10, 1930.  W. W. LASKER  1,763,163
AUTOMATIC VISIBLE CARD PERFORATOR
Filed June 28, 1922  8 Sheets-Sheet 1
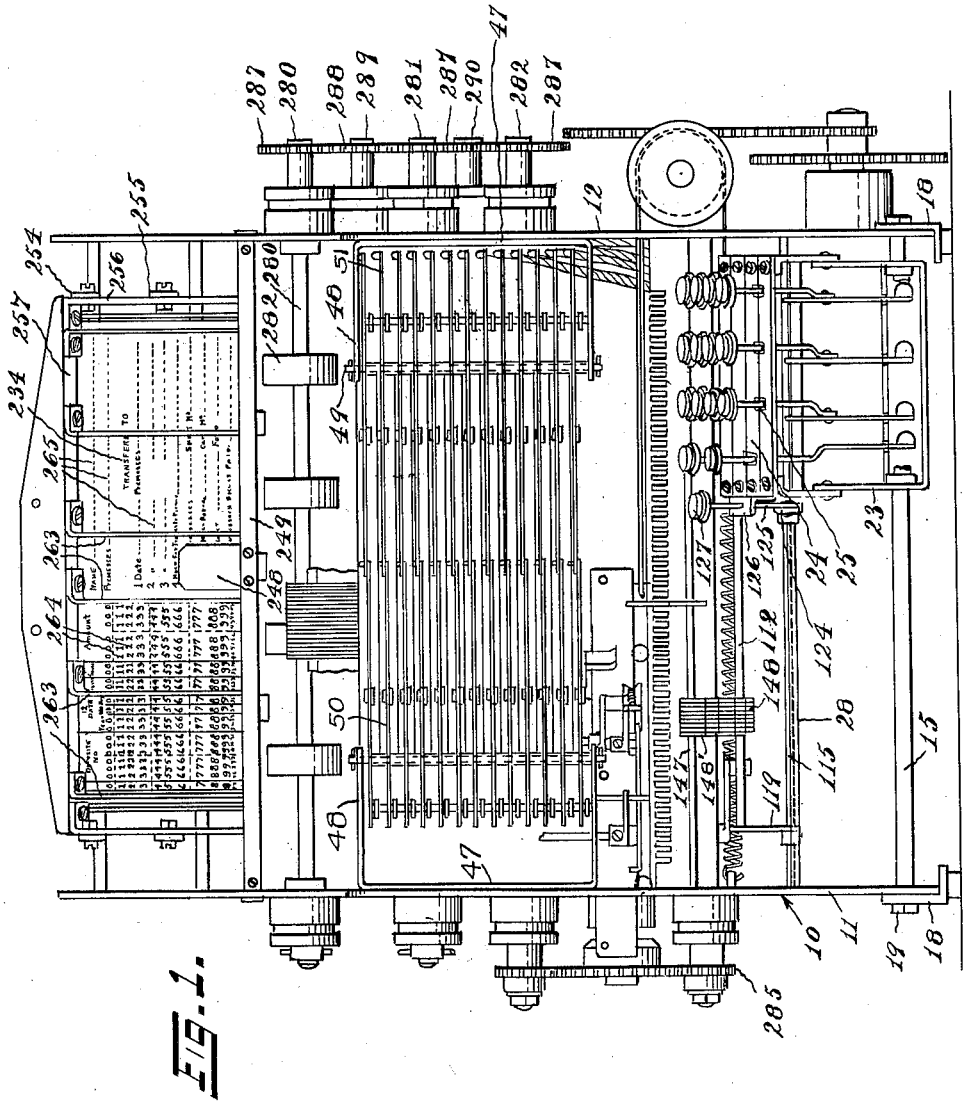

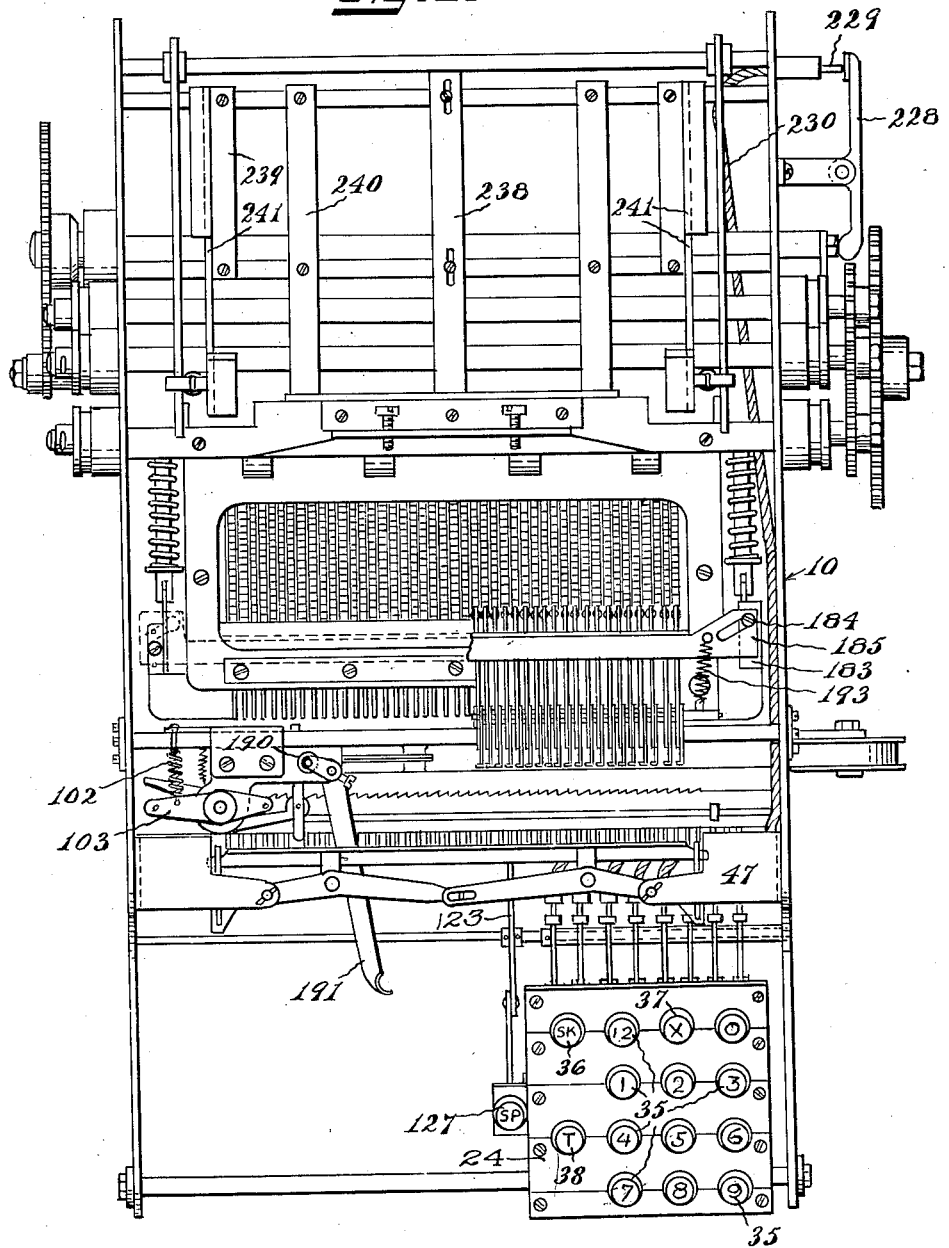

June 10, 1930.   W. W. LASKER   1,763,163
AUTOMATIC VISIBLE CARD PERFORATOR
Filed June 28, 1922   8 Sheets-Sheet 3
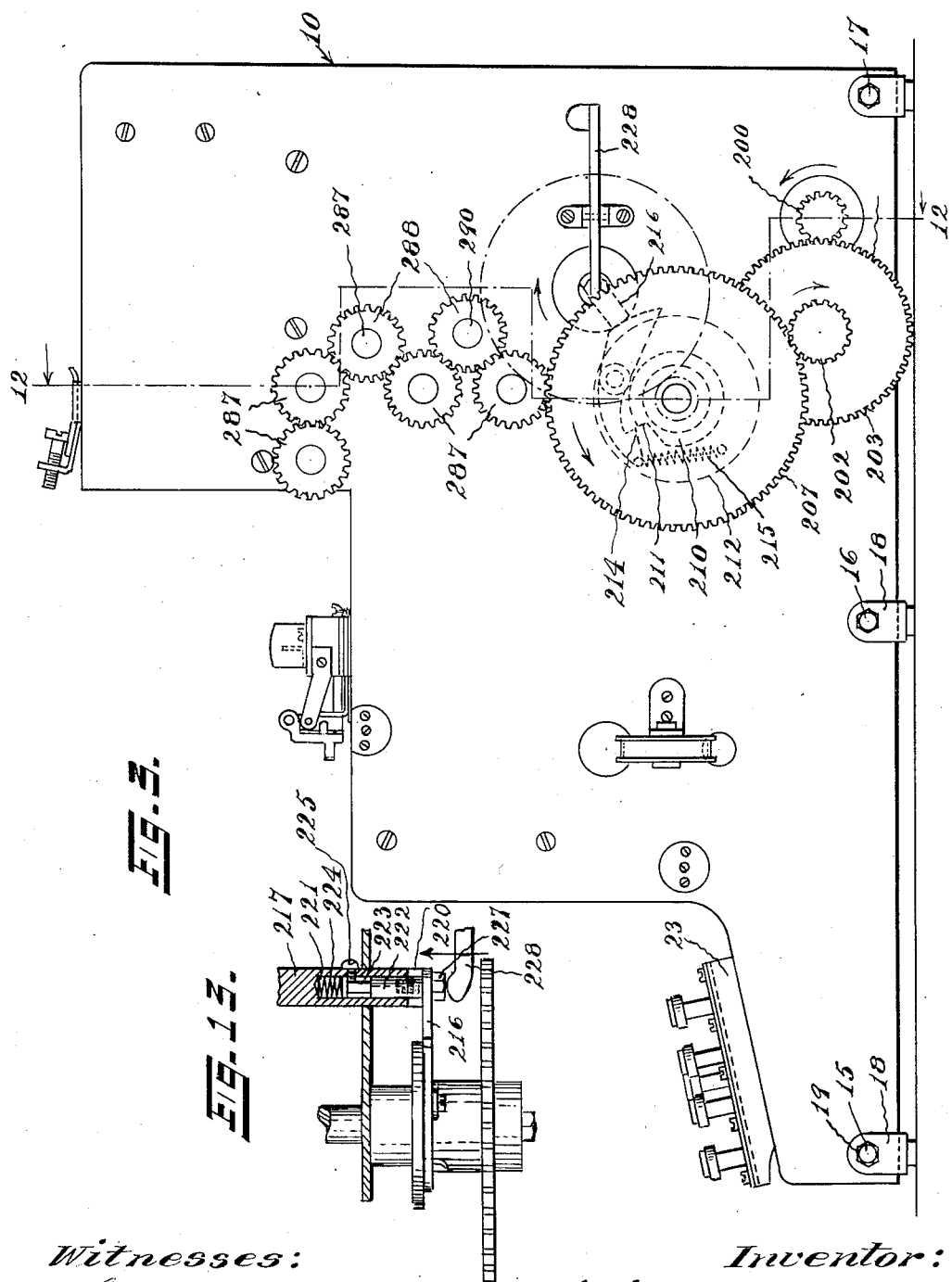

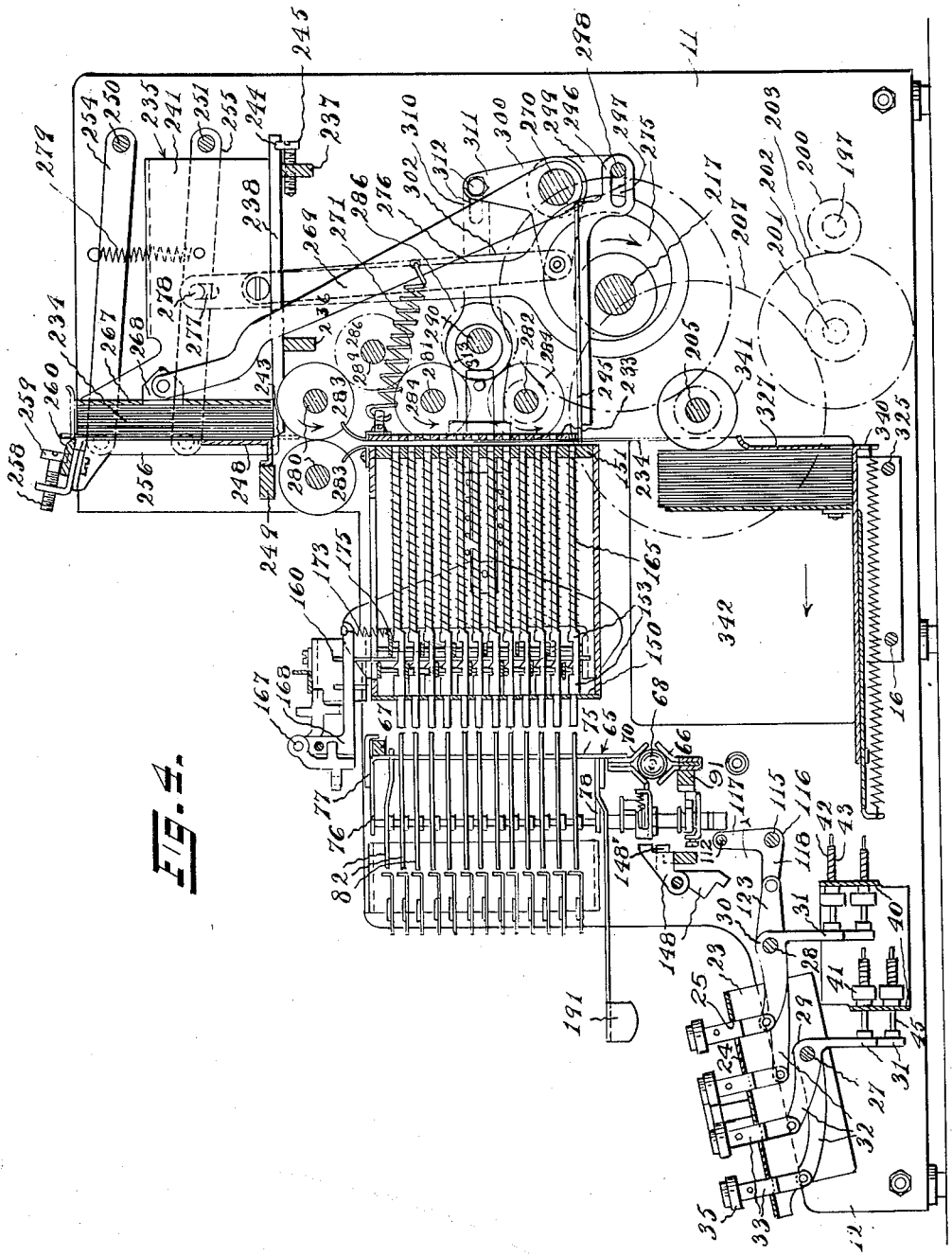

June 10, 1930.  W. W. LASKER  1,763,163
AUTOMATIC VISIBLE CARD PERFORATOR
Filed June 28, 1922   8 Sheets-Sheet 5
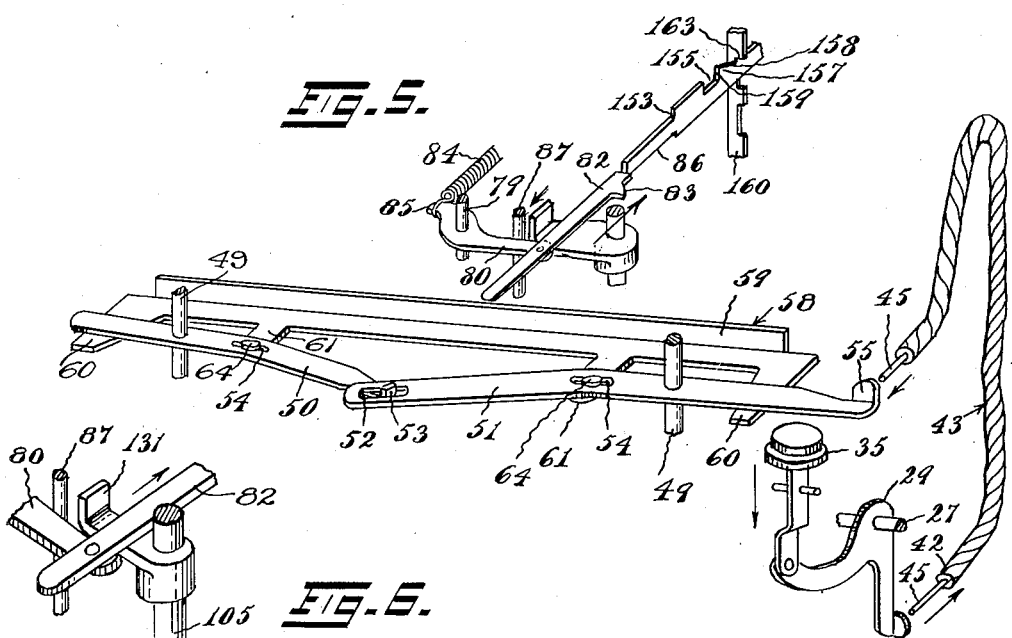
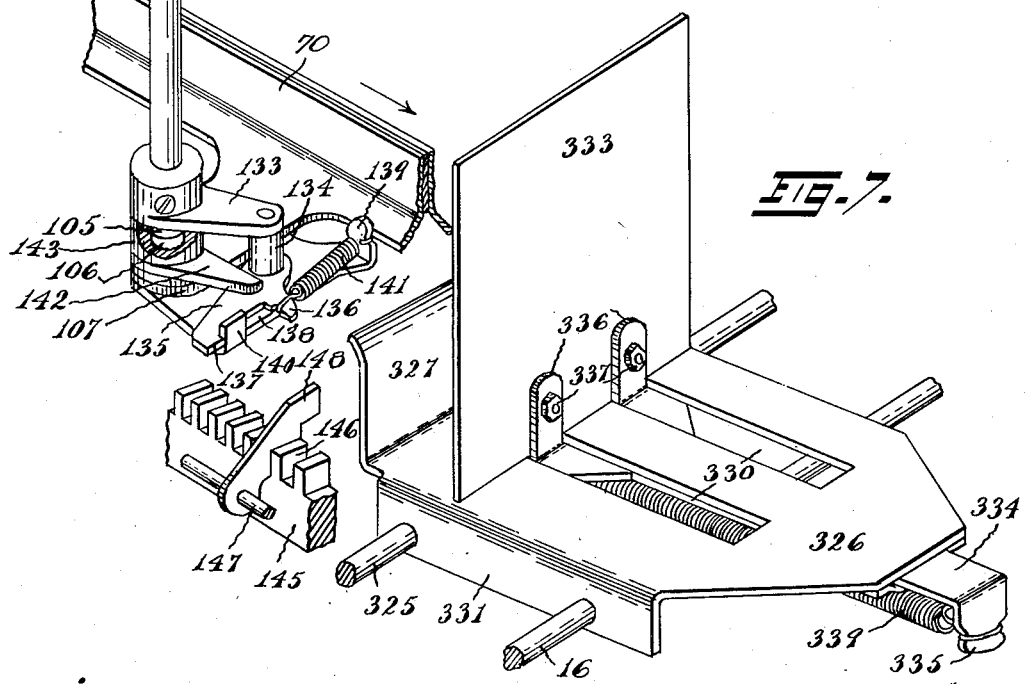
Witnesses:  Inventor:
William W. Lasker,
By his Att'y, June 10, 1930.    W. W. LASKER    1,763,163
AUTOMATIC VISIBLE CARD PERFORATOR
Filed June 28, 1922    8 Sheets-Sheet 6
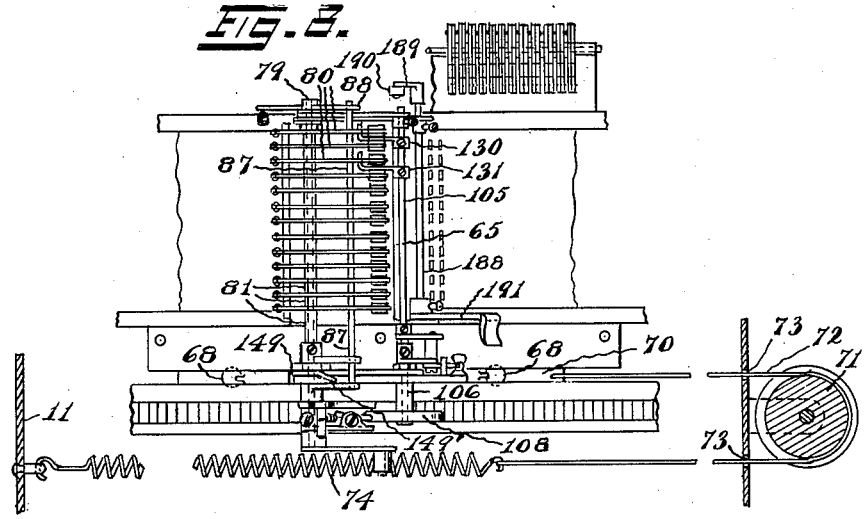
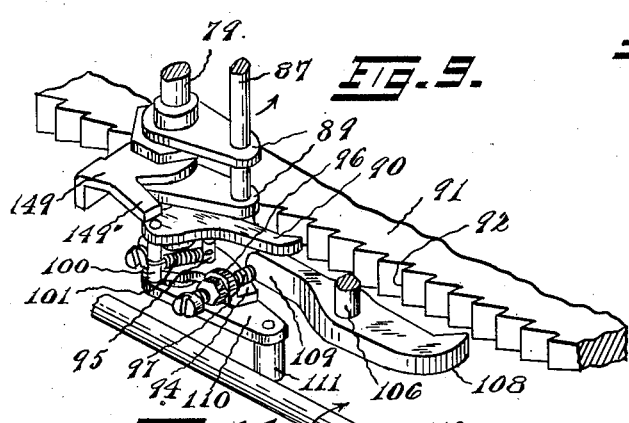
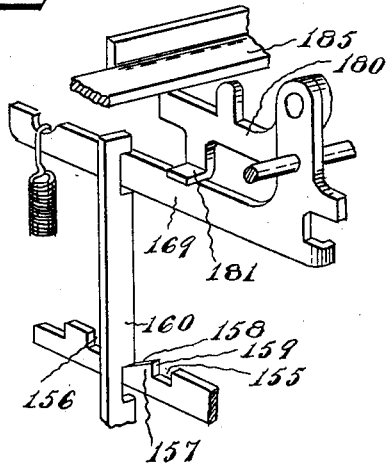
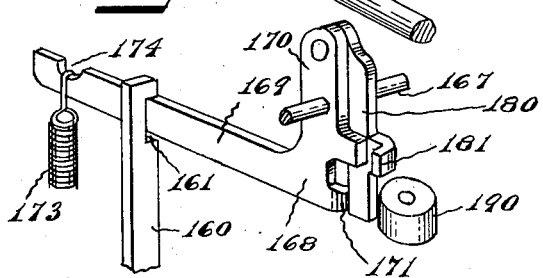
Witnesses:
S.C. Barban
H.D. Penney
Inventor:
William W. Lasker,
By his Att'y, F.H. Richard

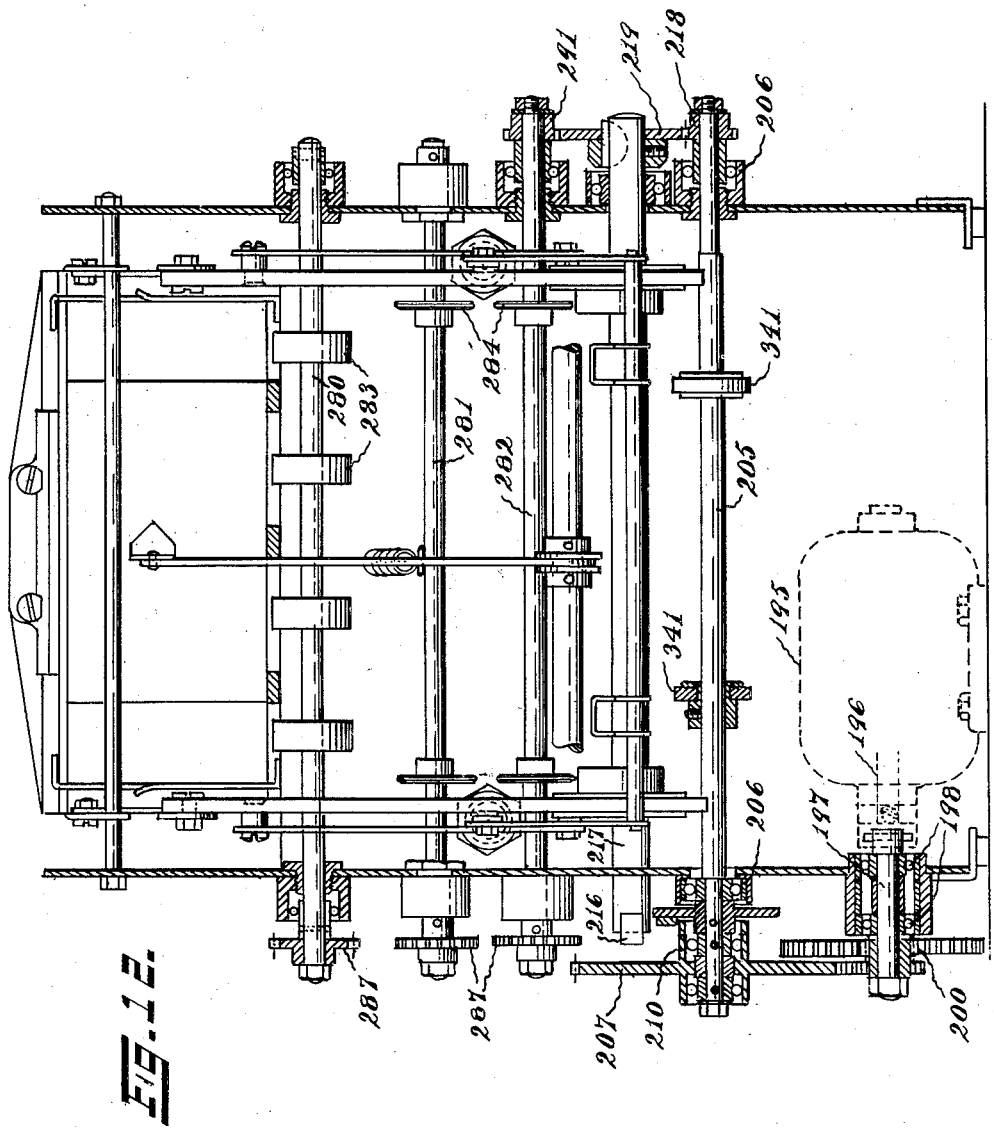

June 10, 1930.  W. W. LASKER  1,763,163
AUTOMATIC VISIBLE CARD PERFORATOR
Filed June 28, 1922  8 Sheets-Sheet 8
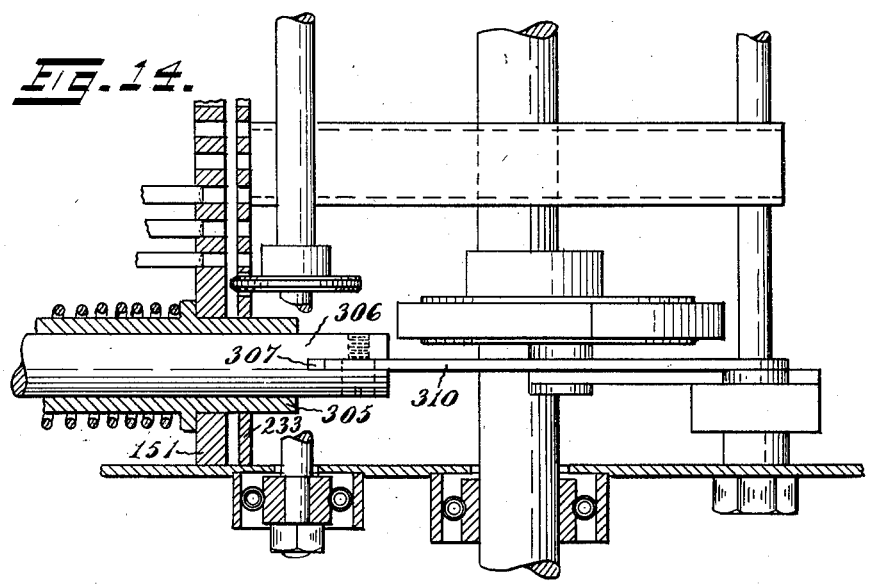
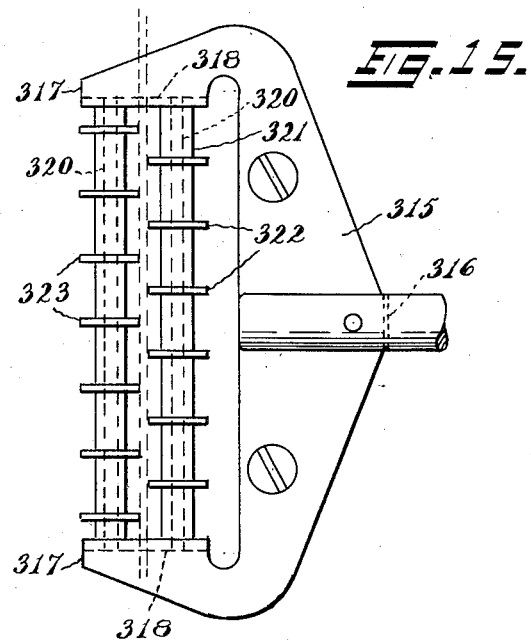

Patented June 10, 1930

1,763,163

UNITED STATES PATENT OFFICE

WILLIAM W. LASKER, OF BROOKLYN, NEW YORK, ASSIGNOR, BY MESNE ASSIGNMENTS, TO REMINGTON RAND INC., OF NEW YORK, N. Y., A CORPORATION OF DELAWARE

AUTOMATIC VISIBLE-CARD PERFORATOR

Application filed June 28, 1922. Serial No. 571,349.

This invention relates to perforating machines for perforating cards such as are used with automatic tabulating accounting machines, though it is noted that the invention is not limited to perforating machines of this kind nor even, in some respects, to perforating machines.

The invention relates to an apparatus of this kind particularly adapted for perforating cards provided both with index point zones for receiving the index perforations and also with data zones provided with blanks for data written or printed therein from which the data for the perforations is obtained.

One object of the invention is to provide an apparatus of this kind in which cards to be perforated are automatically rendered face-visible in order that the written data may be read by the operator, who may then operate the keys of the machine to perforate this data in the index point zone of the same card.

Other objects of the invention are to provide in an apparatus of this kind, improved key-board and punch-setting and operating mechanisms, improved escapement and skip-release mechanisms for the punch setting mechanism carriage, an improved one-revolution clutch for connecting the various power operated mechanisms with the source of power, and an improved magazine and receptacle for the cards.

Other objects of the invention are to improve generally the simplicity and efficiency of such perforating machines and to provide an apparatus of this kind which is durable, economical to manufacture and operate and which will not easily get out of order.

The inventive features for the accomplishment of these and other objects are embodied in an improved perforating machine which, briefly stated, comprises actuating keys and transverse actuating bars actuated by the keys, a column of setting-bars carried on a transversely movable carriage controlled by an escapement mechanism actuated by said setting bars or independently. The setting-bars register successively with columns of punches cooperating with the perforations of a die plate of a card cage receiving cards from a magazine having its throat disposed toward the front discharging into said cage.

As it is desirable to skip from one column of index points to a column two or more columns to one side, there is provided a skip releasing mechanism settable by certain of said bars to hold the escapement released to permit the carriage to skip, and adjustable stops for disabling the releasing mechanism to stop the carriage at the required point.

There are also provided latches to hold set punches set, means for locking selected latches, and a power operated grid engageable with said latches for actuating said punches.

Other objects of the invention will appear as the description proceeds; and while herein details of the invention are described, the invention is not limited to these, since many and various changes may be made without departing from the scope of the invention as claimed.

In the accompanying drawing, showing by way of example, one of many possible embodiments of the invention, Figs. 1 and 2 are respectively front elevation and plan of the perforating machine;

Fig. 3 is a side elevation;

Fig. 4 is a longitudinal vertical sectional view, partly in elevation of the machine;

Figs. 5, 6 and 7 are respectively fragmental perspective views of the punch setting mechanism, the skip release mechanism and the card receiver or receptacle;

Fig. 8 is a fragmental front elevation of the carriage;

Fig. 9 is a fragmental perspective view of the escapement mechanism;

Figs. 10 and 11 are fragmental perspective views of the latch release and lock mechanism showing releasing and locked positions respectively;

Fig. 12 is a transverse vertical sectional view, partly in elevation of the machine taken on the line 12—12 of Fig. 3 looking in the direction of the arrow of said line;

Fig. 13 (Sheet 3) is a fragmental sectional view, partly in plan, of the one-revolution clutch;

Fig. 14 is a fragmental plan, partly in horizontal section, of the punch operating mechanism; and Fig. 15 is a fragmental side elevation of one of the grid supports.

The machine case

The various mechanisms of the perforating machine are contained in a main case comprising a pair of side plates 11 and 12 connected at the lower part by tie rods 15, 16 and 17 (Fig. 3) on which are received inturned feet 18 secured by nuts 19 on said rods against the outer face of the side plates.

The keyboard mechanism

A key lever housing 23 secured between the forward part of the side plates comprises a plurality of transverse top plates 24 provided with edge slots 25. Front and rear fulcrum rods 27 and 28 (Fig. 4) extended respectively across said key housing 23 and the main case 10 just to the rear of the housing carry numeral, skip and trip key levers 29 and 30 fulcrumed on said fulcrum rods and provided with downturned active arms 31 and forwardly disposed motive arms 32, the latter being connected to approximately vertically slidable key bars 33 pivoted at their lower ends to said motive arms and carrying key buttons 35, 36, 37 and 38 (Fig. 2) at the upper end. Anchor bracket plates 40 fixed to the side plate 12 at the rear of said housing 23 receive thimbles 41 receiving the outer members 42 of flexible push cables 43 having their inner members 45 engaged by said active arms 31 for actuating and setting mechanism now to be described.

The actuating bars

Vertically disposed pivot rod brackets 47 (Fig. 1) fast on the inner faces of said side plates are provided with inturned arms 48 receiving vertical pivot rods 49 on which are intermediately fulcrumed flat horizontal actuating levers 50 and 51 (Fig. 5) arranged transversely of the machine, in pairs one above the other and having their inner ends loosely connected by a slot and tongue connection 52, 53, each lever having a longitudinal slot 54 in its inner arm. The outer arms of the levers 51 on the side toward said key housing have upturned lips 55 receiving the inner members 45 of said cables 43 respectively, whereby when the key buttons 35 are depressed the outer ends of said actuating levers are moved forwardly in the direction of the upper arrow of Fig. 5 and said slots are moved rearwardly, thereby moving rearwardly actuating bars 58 associated with each pair of actuating levers and extending approximately from side to side of the machine and having an upturned actuating flange 59 and frontwardly disposed end guides 60 and intermediate guides 61. Stud rivets 64 connect said intermediate guides 61 to said longitudinal slots 54, whereby said guides are held in guided relation with the actuating levers and the actuating bar is actuated rearwardly when the slots are moved rearwardly on the actuation of the key levers, for a purpose to be explained.

The carriage

The carriage 65 (Figs. 4 and 8) is supported on a fixed V-rail 66 mounted between said side plates 11 and 12 lower than the lowest actuating bar 58 and substantially under a guide bar 67 also mounted between the side plates. Balls 68 disposed in said rail, support a movable inverted V-shaped carriage rail 70 resting on said balls and slidable longitudinally of the fixed rail and transversely of the machine, under the influence of a yieldable means comprising a pulley wheel 71 (Fig. 8) mounted outside of the right hand side plate over which passes a metallic ribbon 72 secured to the right hand end of the movable rail 70 and passed through openings 73 in the right hand side plate and over said wheel to a spacing or feed spring 74 tensioned between the free end of said ribbon and the left hand side plate 11 whereby said carriage rail is yieldably drawn to the right.

The carriage comprises a vertical carriage frame plate 75 having a vertical series of openings therein and secured fast on the upper part of said carriage rail 70 and touching the front face of said guide bar 67 and there bent frontwardly to form a horizontal top plate 76 on which is mounted a retaining piece 77 fast on said top plate and engaging over said guide bar 67, whereby the frame plate is held against forward movement. The lower part of the carriage comprises a forwardly disposed horizontal bottom plate 78 secured fast to the carriage rail and frame plate.

The punch setting mechanism

A vertical escapement or feed shaft 79 (Figs. 8 and 9) pivoted in said top and bottom plates carries a vertical series of retracting supporting levers 80 (Figs. 5 and 8) intermediately fulcrumed on and relative to said escapement shaft and held spaced by collars or sleeves 81 and having one arm pivotally supporting and guiding the front end of a vertical series of setting bars 82 disposed adjacent and perpendicular to said actuating bars 58 and passing through said openings of the carriage frame plate and provided with lateral projections 83 on the rear ends to limit their frontward movement. Springs 84 tensioned between hooks 85 and said carriage frame plate move said retracting levers 80 and setting bars 82 yieldably retracted frontwardly after they have been pushed rearwardly by the actuation of the actuating bars resulting from the depression of the key levers. The setting bars 82 set the punches 86 as will be hereinafter explained.

The escapement mechanism

A vertical actuating rod 87 disposed just behind the retracting levers 80 is carried by an upper actuating arm 88 (Fig. 8) and two lower actuating arms 89 (Fig. 9) fast on said feed or escapement shaft 79 above and below the series of retracting levers, to rock the spacing shaft when the retracting levers are pushed back. A rightwardly pointing escapement or feed pawl 90 loosely disposed on the lower part of said spacing shaft at times engages a rack 91 fast on said fixed rail 66 (Fig. 4) and having teeth having steep shoulders 92 disposed to the left and engageable by said pawl. A releasing arm 94 fast on said escapement shaft a distance beneath said pawl is provided with an anchor pin 95 on its rear part and on the front of its free end with an upturned lip 96 having a tapped opening therein receiving a detent screw 97 adjustably held in said opening by a jam nut for a purpose presently to be described. A limiting pin 100 fast on and projecting downwardly from the front part of said pawl receives an end of a spring 101 tensioned between said limiting pin 100 and said anchor pin 95 whereby the pawl is normally yieldably drawn toward engagement with the rack and until the limiting pin is in engagement with the releasing arm. By this means the pawl may move from the rack independently of rotation of the escapement shaft. A spring 102 (Fig. 2) stretched between the frame plate 76 and an arm 103 fast on the escapement shaft holds the pawl 90 normally disengaged from the rack. A releasing shaft 105, to the right of said escapement shaft, rotatably disposed in an opening in said upper frame plate is held alined as will be explained with a stub-shaft 106 (Fig. 9) disposed in a lateral extension 107 (Fig. 6) provided on said carriage rail. Said stub-shaft 106 carries fast on its lower end a releasing pawl 108 having its right hand end normally engaged with the rack 91 and its left hand arm 109 engaged by said detent screw 97 to disengage the releasing pawl from the rack when the arm 94 is rocked inward to permit the pawl 90 to stop the carriage as it moves one space. This action takes place each time a key 35 is depressed.

A spacing arm 110 (Fig. 9) fast on the lower end of said escapement shaft is provided at its free end with a downwardly projecting engagement pin 111 engageable by a spacing rod 112. A spacing shaft 115 (Figs. 1 and 4) disposed across the machine between the side plates carries a bell-crank 116 fast thereon near said key levers and having an upturned active arm 117 and a forwardly pointing motive arm 118. An upturned active arm 119 is mounted fast on the other end of the spacing shaft 115; and the spacing rod 112 is carried fast between the free ends of said active arms in position to be engageable with said engagement pin 111 (Fig. 9) to rock the escapement shaft. An escapement key lever 123 (Fig. 4) is intermediately fulcrumed on said rear fulcrumed rod 28 and has its rear arm pivoted to said motive arm 118, and its forward arm 124 (Fig. 1) pivoted to a spacing key bar 125 passing through a slotted key bracket 126 on the left hand side of said key lever housing 23. The upper end of the bar 125 is provided with a spacing key button 127.

The skip release and stop mechanism

Engagement arms 130 and 131 (Fig. 8) fast on the upper part of said releasing shaft 105 are provided with upturned fingers disposed behind the top and third to the top retracting levers 80 actuated by the skip key 36 and the x or 11-key 37, whereby when the skip key or x-key is depressed, the releasing shaft 105 is rocked. A latch carrying arm 133 (Fig. 6) fast on said releasing shaft is provided at its end with a downturned pivot pin 134 carrying a latch 135 pivoted on said pin and provided with a spring engaging hook 136 and a latch hook 137. A detent plate 138 fast on the extension 107 carries a spring hook 139 and an upturned detent 140 against which said latch hook 137 normally rests without hooking over it. A spring 141 is tensioned over said spring hooks 136 and 139, whereby said latch hook is yieldably held in hooking engagement with the detent 140 when said releasing shaft is rocked forward. A releasing arm 142 having a hub 143 fast on said stub-shaft 106 and furnishing an alining bearing for the lower end of the releasing shaft 105 is engageable by said pivot pin 134, whereby the releasing pawl 108 is disengaged from the rack 91 and held disengaged as long as the latch hook 137 is detained on the detent 140, to permit the carriage to be drawn along by the escapement spring 74 until said latch is knocked from the detent.

A tabulating rack bar 145 (Fig. 6) is disposed across the machine in front of said escapement rack and is provided on its top face with teeth forming interdental recesses 146, in which are received a plurality of thin tabulating stops 148 (Figs. 1 and 4) slidably and pivotally mounted on a slide rod 147 mounted between said side plates in front of the tabulating rack bar. Said stops are adapted to be hung entirely in front of said tabulating rack as in the lower position of Fig. 4 or to be placed in any one of said recesses (as in Fig. 6) thereby to project into the path of said latch 135 when the latter is caught upon the upturned detent 140, whereby said latch strikes against the stop and is knocked from the detent to permit the releasing pawl to re-engage the escapement rack to stop the carriage. Leftward movement of the carriage may be stopped at any point desired by throwing up the leftmost stop 148' in position to be engaged by the left face of the projection 149 (Fig. 9), fast on the carriage. In this case the stop should be adjustably positioned to stop the carriage at the desired point.

It is noted by reference to Figs. 1 and 4, that the carriage stop 148' is not so high, when set, as the tabulating stops 148, and therefore does not in any way touch or act upon the hook 137. In like manner, the projection 149 is so low that it is never engaged by any stop 148.

If it be desired to move the carriage leftwardly of the set carriage stop 148', the latter is merely slightly raised to let the projection 149 pass under. If then it be desired to restore the carriage to the right of the set carriage stops 148', the carriage is merely moved to the right in the normal manner, the inclined face 149' automatically camming under and raising the stop 148' without thought on the part of the operator. Several carriage stops 148' may be provided if desired.

*The punches and punch latches*

The settable punches 86 are disposed in a housing formed of front and rear guide plates 150 and 151 (Fig. 4) provided with alined guide perforations alined with said setting bars 82 except the topmost bar and receiving the columns of punches respectively. The punches are engageable by said setting bars 82 at the time alined with the punches to be yieldably pressed rearwardly, and each has an enlarged portion 153 (Fig. 5) normally abutting said front plate 150 and provided in its top edge with a rectangular notch 155 and an oblong notch 156 (Fig. 10) forming therebetween a triangular projection 157 formed with an inclined advance edge 158 and an abrupt butt edge 159. A vertically movable latch 160 is disposed between each pair of adjacent columns of punches and projects above the housing and is provided in its top with a lateral recess 161 (Fig. 11) and intermediately with recesses forming lateral abutments 163 (Fig. 5) normally in advance of said advance edges 158 and engageable by said advance edge as the punch is moved rearwardly to set position under the action of the setting bar 82 thereby to raise the bar to permit the latch to snap against said butt edge 159 to hold the punch set. A spring 165 (Fig. 4) compressed between said rear plate 151 and said portion 153 restores the set punch when the latch 160 is raised.

*The latch release and lock*

A fulcrum rod 167 disposed across the machine frontward of and slightly above said latches carries a plurality of L-levers 168 having oblong rearwardly disposed notched arms 169 (Fig. 11) disposed in said lateral recesses 161, and upturned arms 170 intermediately fulcrumed on said fulcrum rod 167 and formed with a laterally turned lug face 171 at the angle of the L-lever. Springs 173 tensioned between the notch 174 of the notched arms and a bar 175 (Fig. 4) across the punch housing below said arms hold the latches yieldably depressed.

Interposing pieces 180 (Fig. 11) pivoted on the upper ends of said upturned arms 170 are adapted to lie in downward position against said lugs 171 and provided with lateral supporting lips 181 adapted to rest on said long arms 169 when the pieces are turned back as in Fig. 10. Locking bar brackets 183 (Fig. 2) mounted on said side plates carry stud screws 184 in the top face of the brackets on which are received a locking bar 185 disposed across the machine on said top races and provided with parallel slots receiving said screws 184 and inclined to the axis of the bar, whereby the bar may be moved rearwardly but will still be held parallel to its normal axis.

A restoring shaft 188 (Fig. 8) mounted in said upper and lower plates at the right hand end of the carriage carries a restoring arm 189 fast on the upper part and carrying a vertical restoring roller 190 mounted on the end of said arm. A restoring handle lever 191 fast on the lower end of the restoring shaft is adapted to be manually moved leftwardly simultaneously to restore the carriage and to rock said restoring shaft thereby to move said roller 190 (Fig. 11) rearwardly and against the downwardly positioned interposing pieces, thereby to press the pieces rearwardly to raise the long arms and the latches to release the set punches to permit them to move to their initial position under the action of the spring 165 (Fig. 4). When the interposing pieces are turned back, as in Fig. 10, they are not engaged by the roller. A spring 193 (Fig. 2) yieldably holds the locking bar forwardly positioned over said interposing pieces when the latter are turned back, thereby to lock the pieces in place and also to prevent the raising of the latches and the release of the set punches. Rearward movement of the locking bar permits the adjusting of the interposing piece from one position to the other.

*The drive means*

The punching and card feed mechanisms are driven by an electric motor 195 shown diagrammatically in Fig. 12, of which the motor shaft 196 is clutched to a clutch shaft 197 and carried in bearings 198 and provided with a small pinion 200. An idler shaft 201 (Fig. 4) carries a small gear 202 and a larger gear 203, the latter meshing with said small pinion 200.

The one-revolution clutch

A main shaft 205 (Fig. 12) extended across and through the machine and carried in ball bearings 206 in said side plates carries a continuously rotary gear 207 loosely mounted on the main shaft and meshing with said small gear 202, and provided with a clutch sleeve 210 fast thereon and provided with a clutch recess 211 (Fig. 3). A pawl disk 212 fast on said main shaft adjacent to said sleeve carries a pawl 214 adapted to be yieldably pressed by a spring 215 into engagement with said clutch recess 211 and normally held from such engagement by a detent arm 216 presently to be described. A one-revolution shaft 217 extending through the machine and geared to said main shaft at an even reducing ratio by gears 218, 219 is provided at the end adjacent to the clutch pawl with a deep transverse end notch 220 and an axial bore 221 (Fig. 13) receiving a plunger pin 222 disposed in said bore and provided with an annular groove 223. A spring 224 compressed between the pin and the inner end of the bore yieldably holds the pin outward; and a set screw 225 in the shaft engaging in said groove 223 limits outward movement of the pin. The detent arm 216 is held by a screw bolt 227 across the outer end of the pin and is slidable in said slot and engageable with the tail of said pawl 214, when the pin is in outward position, to hold the pawl from the clutch recess to permit the one revolution shaft to remain at rest, as the gear 207 rotates.

A tripping lever 228 (Figs. 3 and 13) intermediately fulcrumed on said side plate 12 and having its active arm engaging said bolt 227 of the detent arm, has its motive arm engageable by the inner member 229 (Fig. 2) of a flexible punch cable 230 actuated by the button 38. Actuation of the trip lever presses inward the detent arm 216 and permits the clutch pawl to engage in the clutch recess 211 (Fig. 3) and be revolved until the one rotation pawl has made a complete revolution, whereupon the detent arm (because of the ratio of the gears 218 and 219) engages the tail of the pawl and disengages the pawl from the recess and permits the one-revolution shaft again to come to rest.

The card cage magazine and picker

A die plate 233 (Fig. 4) fixed a slight distance to the rear of said rear plate 151 of the punch housing forms therewith a cage for the cards 234 from the magazine 235 and is provided with die perforations adapted to receive the active ends of the punches. The magazine is carried on supporting bars 236 and 237 disposed across the machine above said one revolution shaft 217 and above the level of the top of said cage. The magazine comprises an adjustable throat knife 238, and side and intermediate supports 239 and 240 (Fig. 2) resting on said bars, on which supports cards to be perforated rest edgewise face forward. Side guide plates 241 are secured to the side supports 239. The throat knife 238 is provided with a knife edge 243 (Fig. 4) at the forward end and a slot 244 in its lower rear face receiving the head of an adjusting screw 245 carried in the rear supporting bar 237, whereby the width of the throat may be adjusted. A throat block or plate 248 forward of said knife and obscuring only a small portion of the front car co-operates with the edge 243 to form the throat through which the cards pass to the die plate 233, and is supported by a block-supporting bar 249 (Fig. 1) disposed across the machine. By this arrangement a card magazine is provided which is open at one end sufficiently to expose the face of the card which is next to be discharged, so that the same may easily be read by the operator.

A pair of fulcrum rods 250 and 251 (Fig. 4) disposed across the machine to the rear of said guide plates 241 carry upper and lower pairs of picker-supporting levers 254 and 255 pivoted to said rods, levers of each pair being superposed at the outer side of said guide plates. Vertical picker supporting uprights 256 (Fig. 1) pivoted for vertical movement at the forward end of each pair of superposed levers carry a picker bar 257 mounted upon the upper ends of the uprights and having a forward upturned tapped flange receiving headed adjusting screws 258 (Fig. 4) in said tapped ears and having heads 259 engaged in longitudinal slots on a picker blade 260 adjustably slidably mounted on the picker bar and slightly projecting at the rear. Retaining bars 263 (Fig. 1) secured to the lower face of said picker bar are disposed edgewise against the front face of the front card so as to obscure as little as possible of the numeral columns 264 and data spaces 265 of the card. A follower 267 (Fig. 4) in said magazine above said supporting bar adapted to press against said cards is provided with a back-turned ear 268 to which is pivoted a follower link 269 extended rearwardly and downwardly to a main fulcrum rod 270 extending across the machine to the rear of said one-revolution shaft 217 and pivotally receiving the lower end of the follower link. The follower is yieldably pressed forward by a spring 271 stretched between the link 269 and die plate 233.

The picker operating mechanism

The picker bar is reciprocated by a pair of eccentrics 275 on said one-revolution shaft 217 and eccentric links 276 received thereon at the lower end and having slot and pin connections 277, 278 with the mid part of the lower picker supporting levers 255, whereby on each revolution of the main shaft, the picker is reciprocated downwardly and back once, thereby to project a card downwardly from the magazine throat. Springs 279 strained between the levers 255 and the upper part of the side plate restores or helps to restore the picker.

Upper and rear feed roll shafts 280, 281, 282 disposed above and to the rear of said cage, formed by the plates 151 and 233, carry upper and rear friction rolls 283, 284 for receiving cards from the magazine and conveying them to and through the cage. Pinions as 287 (Fig. 3) on said feed roll shafts and idlers 288 on idler shafts 289, 290 constrain said rolls to move together, the shaft 282 being driven by gear 291 (Fig. 12) from the gear 219 for rotating all of said friction rolls.

The card gate

A horizontal card gate 295 (Fig. 4) slidably mounted at the lower part of said cage is provided at the rear end with downturned ears 296 having horizontal slots 297 disposed under said main fulcrum shaft and slidably received on a shift bar 298 carried by said lower arms 299 of T-levers 300 fulcrumed at their intersections on said main fulcrum rod, whereby the card gate is reciprocated as the T-lever rocks, to retain or permit to pass the card in the cage. Reciprocatory links 302 are pivoted at their upper ends to the upper part of said eccentric links 276 and at the lower part to forward arms of the T-levers whereby the T-levers are rocked as the picker is reciprocated.

The latch grid and punch operating mechanism

Guide sleeves 305 (Fig. 14) mounted in and projecting through said plates 151 and 233, at the ends of the cage, and parallel to and at the sides of the punch housing, carry guide rods 306 slidable in the sleeves and provided with rear vertical end slots 307 receiving the front ends of draft links 310 pivoted in said rear end slots and to upturned arms 311 (Fig. 4) of the T-levers, by pin and slot connections 312. The shaft links 310 are provided with a large intermediate ring portion 313 receiving the idler shaft 290 to prevent interference. Bifurcated grid supports 315 (Fig. 15) fast in front slots 316 in the rods 306 have forwardly projecting upper and lower arms 317 carrying upper and lower bar supports 318 mounted between said arms, and disposed above and below the columns of punches, and carrying vertical rods 320 disposed between said columns on both sides of the plane of the latches 160. Spacing collars 321 on said rods hold in spaced relation horizontal force plates 322, 323, provided with perforations received on said rods, engaging on both sides of said latches, whereby when the T-levers are rocked said latches are drawn rearwardly and press against the abrupt faces 159 (Fig. 10) of any set punches and force the punches through a card in the cage into the die perforations of the die plate 233, thereby to perforate the card.

The card receptacle

A supporting rod 325 (Fig. 7) passed across the lower part of the machine to the rear of the middle tie rod 16, and together with said tie rod supports a receptacle bottom plate 326 approximately under said cage. Said bottom plate is also provided with parallel longitudinal guide slots 330, and downturned side flanges 331 provided with holes receiving said supporting and middle tie rods. A yieldable vertical follower 333 slidably disposed on said bottom plate is carried by a tongue 334 slidable beneath said bottom plate and having a downturned forward end 335 and upturned rear ears 336 passing through said slots and secured to the follower by bolts 337. A spring 339 tensioned between said end 335 and a downturned ear 340 (Fig. 4) of the bottom plate 326 tends to move the follower toward the wall 327. Friction rollers 341 on said main shaft 205 position the cards ejected from the cage as shown in Fig. 4. The cards may be removed from the receptacle through the large opening 342 in the side plate 11.

Operation of the machine as a whole

The operation of the machine will be understood from the foregoing and now need be only summarized as follows:

The follower 267 (Fig. 4) is moved back and the cards 234 to be punched are placed face forward between the guide plates 241 (Fig. 2) of the magazine with the edges of the card resting on the supports 240 and the knife 238, the knife being adjusted to give the proper micrometer width to the throat. The follower then is allowed to press the cards forward under the action of the spring 271.

If the cards are provided with a data zone provided with data receiving spaces 265 (Fig. 1), the operator reads the data thereon, moves the carriage back or operates the button 127 (Fig. 1) until the setting bars 82 become alined with the proper column of punches.

Operation of the keyboard and punch setting mechanism

The operator then presses the proper button 35 or 37 in order to perforate the proper index point of the card. This depressing of the button pushes back the associated actuating bar 58 (Fig. 5) setting bar 82 and punch 86 and causes the latch 160 to catch the abutment 159.

Operation of the escapement mechanism

This actuating of the setting bar 82 actuated the retracting lever 80, actuating rod 87 and therefore moves in the pawl 90 (Fig.

9) and forces outwardly the active end of the releasing pawl 108, thus feeding the carriage to bring the setting bars 82 (Fig. 5) into alinement with the next column of punches.

Operation of the one-revolution clutch

The above operation is repeated until the punches for all of the index-point columns to be perforated are set, whereupon the button 38 is depressed, thus forcing inwardly the pin 222 (Fig. 13) and the detent arm 216, releasing the pawl 214 (Fig. 3) and causing the main shaft and the one-revolution shaft to rotate until the detent arm 216 has made one revolution and engaged and released the pawl 214.

Operation of the latch grid and punch operating mechanism, the card gate and picker At the beginning of the rotation of the one-revolution shaft, the various parts of the machine are in the position of Fig. 4, and rotation of this shaft forces down the picker knife 260 and rocks the T-lever 300. The picker knife brings down the card which has just been read to the rollers 283, and the rocking of the T-lever opens the card gate and permits the previous card in the cage 151, 233 (the punches having been previously retracted) to pass out of the cage to the receptacle under the influence of the rollers 284 and 341 while the card from the magazine is being drawn down by the rollers 283. During this time, because of the lost motion of the pin and slot connection 312, the punches remain at rest.

After the eccentrics 275 pass their lower position of movement, the picker rises for its next stroke but the card gate does not close and the punching action does not take place until after the previous card leaves the cage. The card gate closes before the new card has reached punching position; but the punching action is delayed until the gate is closed. Continued rotation of the one-revolution shaft now takes up all of the lost motion in the connection 312 and causes the draft links 310 (Fig. 14), the rods 306, the force plates 323, the latches and the set punches to be drawn rearwardly, thus perforating the cards as the eccentrics 275 pass their uppermost position, during which time the pin and slot connection 278, 277 permits the picker to rest at its highest point. If desired a light spring may be used to close the card gate.

Operation of the card receptacle

As the cards are discharged into the receptacle, they are forced by the roller 341, between the previous card and the wall 327, forcing back the follower 333 against the spring 339 until it is desirable to remove the accumulated perforated cards through the opening 342.

Operation of the latch release

After each card is punched, the handle 191 (Fig. 2) is grasped and moved to the left carrying the roller 190 rearwardly and the carriage leftwardly, the roller 190 engaging all downturned interposing pieces 180 and releasing the associated set latches.

After this has been done the previous operation may be repeated until all of the desired perforations have been made.

Operation of the latch lock

It is often the case, as when many cards are punched relating to the same data, classification or the like, it is desirable to be able to set and lock punches in certain combinations, which are to be used repeatedly. This is accomplished by setting the punches, as above described, for the first card, and then, before restoring the carriage, locking the punches that are to be repeated, by forcing back the bar 185 (Figs. 2 and 10), throwing back the interposing pieces 180 of such punches, as in Fig. 10, and then permitting the bar 185 to resume its normal position. Thus, when the carriage and the roller 190 are thrown back, the latches of the locked punches will not be released and cannot be released accidentally.

Operation of the skip, release and stop mechanism

If the locked punches are the most leftward punches, or if the data zone 234, is to the left of the card (instead of the right, as in Fig. 1) one of the carriage stops 148' is thrown up to the left of the projection 149 (Fig. 9) and positioned at a point only far enough to the left to permit the carriage to be carried leftward to position to perforate the most leftward index point column that is to be perforated.

It often happens, as when the group of locked punches occurs at an intermediate part of the index zone or for other reasons, that it is desirable to skip a portion of the index zone without setting, or again setting, the punches therefor. In such cases, the button 36 (Fig. 2) may be depressed, thus actuating the top actuating lever 80 and the top setting bar 82 (for which no punch is provided). This actuates the engaging arm 130 (Fig. 8), the releasing shaft 105 and the pin 134 (Fig. 6), the latch 135 hooking the end 137 over the detent 140 releasing and holding released the pawl 108 (Fig. 9), the pawl 90 being normally held released, and permits the carriage to move past such portion for which the punches are not to be set. As the 11-punch is above the other columns and as a skip is often to be made after punching the 11-hole, an arm 131 (Fig. 8), may be associated with the 11 or x-key (Fig. 2), but this is not necessary.

After the carriage has passed the portion where no punches are to be set, it is stopped in position to resume punch setting by previously positioning one of the stops 148 as in Fig. 6, in position to knock the hook 137 from the detent 140 at the position where punch setting is to be resumed, whereupon the punch setting is resumed as first described.

I claim:

1. In a card punching machine, the combination of a keyboard, punch mechanism controllable from said keyboard, a device for holding a card to be punched and formed so as to expose the face of the card to the operator of the machine, means for moving said card from exposed position to operative position with relation to said punch mechanism, and operating mechanism correlated with said means and with said punch mechanism for first causing said means to move said exposed card from exposed position to operative relation with said punches and thereafter during the same cycle of operation causing said punch mechanism to punch said card according to the control of said keys.

2. In combination, a keyboard, punch mechanism controllable from said keyboard, a magazine for holding cards to be punched and formed so as to expose the major portion of the face of one of the cards held by it in such position as to be easily readable by an operator when the operator is in proper position for manipulating said keyboard, a picker for feeding said cards from said magazine, one at a time, and operating mechanism correlated with said picker and punch mechanism to first move the exposed card into operative relation to said punch mechanism and thereafter during the same cycle of operation effect punching of such card according to the set-up effected by said keyboard, whereby during a single cycle of operation, data on said card may be read by the operator, set up on the keyboard and punched on said card.

3. In combination, in a perforating machine, punches; keys at the forward end of the machine for setting the punches; a cage having dies cooperating with the punches; a magazine discharging into the cage and receiving the cards edgewise face forward, the front of the magazine being open to expose the face of the front card; and a picker for picking off the exposed card and discharging it into the cage.

4. In combination, in a perforating machine, keys on the forward end of the machine; settable punches; means whereby said punches are set from said keys; a cage having dies cooperating with the punches; a magazine adapted to receive cards on edge face forward and having an adjustable throat at its forward end over said cage, the end over said throat being open to expose the face of the cards; and a picker for picking off the exposed card and discharging it into the cage.

5. In combination, in a perforating machine, punches; means for selecting and actuating the punches; a cage having dies cooperating with the punches; a magazine discharging into the cage and receiving the cards edgewise face forward, the front of the magazine being open to expose the face of the front card; a vertically movable picker bar at the forward end of said magazine and having a picker knife over the throat; retaining bars secured to the lower face of said picker bar and disposed edgewise against the front face of the front card and placed edgewise to obscure as little as possible of the card when viewed from the front; a follower in said magazine above said supporting bar and adapted to press against said cards and to press the cards against said retaining bars; and means for reciprocating the picker bar.

6. In combination, in a perforating machine, keys on the forward end of the machine; settable punches; means whereby said punches are set from said keys; a cage having dies cooperating with the punches; a magazine adapted to receive cards on edge face forward and having an adjustable throat at its forward end over said cage, the end over said throat being open to expose the face of the cards; a vertically movable picker bar at the forward end of said magazine and having a picker knife over the throat; retaining bars secured to the lower face of said picker bar and disposed edgewise against the front face of the front card and placed edgewise to obscure as little as possible of the card when viewed from the front; a follower in said magazine above said supporting bar and adapted to press against said cards and to press the cards against said retaining bars; and means for reciprocating the picker bar.

7. In combination, in a perforating machine; actuating keys; transverse actuating bars actuated by the keys; a transversely movable carriage; setting bars on the carriage and actuated by the actuating bars; retracting levers for said setting bars; an escapement shaft on said carriage; a vertical actuating rod disposed just behind the retracting levers; an upper actuating arm and two lower actuating arms supporting said rod and fast on said spacing shaft above and below the series of retracting levers, to rock the spacing shaft when the retracting levers are pushed back; supporting levers pivoted to the setting bar and engaging said rod; settable punches actuated by said setting bars; and dies cooperating with the punches.

8. In combination, in a perforating machine, actuating keys; a carriage carrying members actuated by the keys; punches set by said members; a die plate cooperating with the punches; an escapement shaft on the carriage; means for actuating said shaft; an escapement pawl loosely disposed on said shaft; a transverse fixed rack engageable by said pawl; and a releasing pawl on said carriage and engaging the rack and indirectly actuated by the escapement shaft to disengage from the rack as the releasing pawl moves inward.

9. In combination, in a perforating machine, actuating means; transverse actuating bars actuated by said means; a transversely movable carriage; an escapement mechanism; a vertical escapement shaft pivoted on said carriage for operating said mechanism; a vertical series of horizontal setting bars arranged longitudinally of the machine and yieldably actuatable rearwardly by said actuating bars and arranged to actuate said escapement mechanism; and a vertical actuating rod connected fast to said escapement shaft and operatively associated with the setting bars to rock the shaft when the setting bars are pushed back.

10. In combination, in a perforating machine, actuating keys; transverse actuating bars adapted to be actuated through the medium of the keys; a transversely movable carriage; setting bars on the carriage and actuated by the actuating bars; retracting levers pivoted to and supporting said setting bars; punches set by said bars; a cage having a die plate cooperating with the punches; a vertical escapement shaft pivoted on said carriage; a vertical actuating rod connected fast to said escapement shaft and operatively associated with the retracting levers to rock the shaft when the setting bars are pushed back; and an escapement actuated by said shaft.

11. In combination, in a perforating machine, actuating keys; transverse actuating bars actuated by the keys; a transversely movable carriage; setting bars on the carriage and actuated by the actuating bars; an escapement shaft on said carriage; an escapement pawl loosely disposed on said shaft; a transverse fixed rack engageable by said pawl; a releasing arm fast on said shaft; a pin on the pawl for limiting the inward movement of the pawl relative to the arm; yieldable means for moving said pawl inward to engage the rack; a stub shaft rotatably mounted in said carriage to the right of said escapement shaft; a releasing pawl on said shaft and having its right hand end normally engaged with the rack and its left hand arm engaged by said releasing arm; and punches settable by said setting bars.

12. In combination, in a perforating machine; transverse actuating bars; a transversely movable carriage; setting bars on the carriage and actuated by the actuating bars; a vertical escapment shaft mounted on said carriage; a vertical actuating rod connected fast to said escapement shaft and operated by the setting bars to rock the shaft; an escapement or feed pawl loosely disposed on said shaft; a fixed transverse rack having teeth having steep shoulders engageable by said pawl; a releasing arm fast on said escapement shaft and provided with an anchor pin at the rear part, and at the front of its free end with an upturned lip; a detent screw in said lip; a limiting pin fast on and projecting downwardly from the front part of said pawl; a spring tensioned between said limiting and anchor pin; a releasing pawl engageable with the rack and releasable by said pin; and punches set by said setting bars.

13. In combination, in a perforating machine, actuating keys; a carriage; setting bar members thereon actuated by the keys; an escapement shaft on said carriage actuated by said setting bar members; an escapement pawl on said shaft; a transverse rack engageable by said pawl; a releasing arm fast on the shaft; means for limiting the inward movement of the pawl relative to the arm; yieldable means for moving said pawl to engage the rack; a releasing pawl on said carriage and having its one end normally engaged with the rack and its other end engaged by said releasing arm; and punches settable by said setting bars.

14. In combination, in a perforating machine, actuating means; setting bars on the carriage actuated by said means; an escapement pawl on said carriage; a rack engageable by said pawl; a releasing arm fast on the shaft; a pin on the pawl for limiting the inward movement of the pawl relative to the arm; yieldable means for moving said pawl inward to engage the rack; a stub-shaft rotatably mounted on said carriage at one side of said escapement shaft; a releasing pawl on said shaft and having its one end normally engaged with the rack and its other end engaged by said releasing arm; and punches settable by said setting bars.

15. In combination, in a perforating machine, actuating keys; a transversely movable carriage; setting bars on the carriage and actuated by said keys; an escapement mechanism comprising an escapement shaft actuated by said setting bars; a spacing arm fast on the escapement shaft; a spacing rod parallel to the rack and connected with and actuatable rearwardly by one of the keys to engage the spacing arm to rock the escapement shaft; punches set by said bars; and a die plate cooperating with the punches.

16. In combination, in a perforating machine, actuating keys; transverse actuating bars actuated through the medium of the keys; a transversely movable carriage; setting bars on the carriage and actuated by the actuating bars; an escapement mechanism actuated by said setting bars and comprising a vertical shaft rockable to effect the escapement; a spacing arm fast on the lower end of said shaft and provided at its free end with a downwardly projecting engagement pin; a spacing shaft disposed across the machine between the side plates; a bell-crank fast on said spacing shaft near said keys and having an upturned active arm and a forwardly pointing motive arm; an upturned active arm fast on and near the other end of the spacing shaft; a spacing rod fast between the free ends of said active arms and engageable with said engagement pin to rock the escapement shaft; and an operative connection between said motive arm and one of said keys and punches settable by said setting bars.

17. In combination, in a perforating machine a casing having side plates; a key lever housing secured between the forward part of the side plates; a plurality of key levers therein; transverse actuating bars actuated by the key levers; a transversely movable carriage; setting bars on the carriage and actuated by the actuating bars; an escapement mechanism actuated by said setting bars; a fulcrum rod passing through the housing; a spacing key lever intermediately fulcrumed on said fulcrum rod and having its rear arm operatively connected to said mechanism; a slotted key bracket on the left hand side of said key lever housing; a spacing key bar passing through said bracket and having its upper end provided with a spacing key button and its lower end pivoted to the forward arm of said spacing key lever.

18. In combination, in a perforating machine, actuating keys; a carriage; setting bars thereon actuated by the keys; punches set by said bars; a die plate cooperating with the punches; an escapement mechanism actuated by said setting bars; a vertical releasing shaft on the carriage; engagement arms fast on said releasing shaft and operatively connected with certain of the setting bars to rock the releasing arm when such setting bars are pushed back; and a skip releasing mechanism settable by said shaft to hold the escapement released.

19. In combination, in a perforating machine, actuating bars; a carriage; an escapement shaft on said carriage; setting bars arranged longitudinally of the machine and actuatable by said actuating bars; means operatively associated with the setting bars to rock the shaft; an escapement pawl operated by said shaft; a transverse fixed rack engageable by said pawl to stop the carriage; retracting levers fulcrumed on said escapement shaft and pivotally supporting the front end of said setting bars respectively; a releasing shaft on the carriage; a releasing pawl operated by said releasing shaft and engaging the rack and actuated by the escapement and releasing shafts to disengage from the rack; engagement arms fast on said releasing pawl lever and provided with upturned fingers disposed behind certain of top retracting levers; and punches settable by the setting bars.

20. In a perforating machine, the combination of actuating keys; a carriage; setting members thereon actuated by the keys; punches set by said members; a die plate cooperating with the punches; a skip releasing mechanism settable by certain of said members to release the carriage.

21. In combination, in a perforating machine, actuating keys; transverse actuating bars actuated by the keys; a transversely movable carriage; setting bars on the carriage and actuated by the actuating bars; an escapement mechnism actuated by said setting bars; punches set by said bar members; a die plate cooperating with the punches; a skip releasing mechanism settable by certain of said bars to hold the escapement released; adjustable stops for disabling the releasing mechanism.

22. In combination, in a perforating machine, actuating keys; transverse actuating bars actuated by the keys; a transversely movable carriage; setting bars on the carriage and actuated by the actuating bars; an escapement mechanism actuated by said setting bars; a releasing shaft; a latch carrying arm fast on the releasing shaft; a latch pivoted on said latch carrying arm; a detent fast on said carriage adapted to be hooked by said latch when the releasing shaft is rocked; a releasing arm connected to the escapement mechanism and engageable by the latch carrying arm to release the escapement mechanism as the latch is held detained; adjustable tabulating stops adjustable to be struck by the latch to release the latch; and means for actuating said releasing shaft.

23. In combination, in a perforating machine, actuating keys; a carriage carrying members actuated by the keys; punches set by said members; a die plate cooperating with the punches; an escapement pawl loosely disposed on said carriage; a transverse rack engageable by said pawl; a releasing shaft on the carriage; a releasing pawl on said carriage and engaging the rack and indirectly actuated from the escapement pawl to disengage from the rack as the releasing arm moves inward; a latch carrying arm fast on the releasing shaft; a latch pivoted on said carrying arm; a detent fast on said carriage adapted to be hooked by said latch when the releasing shaft is rocked; a releasing arm connected to the releasing pawl and engageable by the latch carrying arm to release the releasing pawl as the latch is held detained; adjustable tabulating stops adjustable to be struck by the latch to release the latch; and means for actuating said shaft and escapement pawl.

24. In combination, in a perforating machine, a carriage; setting bar members thereon; punches set by said bar members; dies cooperating with the punches; an escapement for the carriage; a skip releasing mechanism to hold the escapement released; and adjustable stops for disabling the releasing mechanism.

25. In combination, in a perforating machine, actuating keys; a carriage carrying setting members actuated by the keys; punches set by said members; a die plate cooperating with the punches; means for operating the set punches; an escapement for said carriage; a tabulating rack bar disposed across the machine in front of said escapement rack and provided on its top face with teeth forming interdental recesses; a slide rod mounted between said side plates in front of the tabulating rack bar; a plurality of thin tabulating stops slidably and pivotally mounted on said rod and adapted to be hung entirely in front of said tabulating rack or to be placed in any one of said recesses thereby to project into the path of said latch when the latter is in holding position, whereby said latch strikes against the stop and is knocked to nonholding position to permit the escapement to stop the carriage; a skip releasing mechanism settable by certain of said bars and comprising latches to hold the escapement released.

26. In combination, in a perforating machine, a carriage; setting members thereon; punches set by said members; an escapement for the carriage; a skip releasing mechanism to hold the escapement released; adjustable tabulating stops for disabling the releasing mechanism; and additional means separate and distinct from the tabulating stops for stopping the carriage.

27. In combination, in a perforating machine, a carriage; a projection thereon having an abrupt face and an inclined face; and an adjustable pivoted stop under which said face may cam and engageable by said abrupt face to stop the carriage.

28. In combination, a carriage; an escapement for the carriage; a skip releasing mechanism to hold the escapement released; adjustable tabulating stops of one height for disabling the releasing mechanism; and adjustable carriage stops of a different height for stopping the carriage without affecting the releasing mechanism.

29. In combination, in a perforating machine, a main case comprising a pair of side plates; tie rods connecting the plates at the lower part; inturned feet secured by nuts on said rods against the outer face of the side plates; actuating keys mounted between said plates; a carriage movable between said plates and carrying setting members actuated by the keys; punches set by said members; a cage having a die plate cooperating with the punches; a magazine discharging into the cage and having a picker; and means for operating said picker and the set punches.

30. In combination, in a perforating machine, a main case comprising side plates; a key lever housing secured between the forward part of the side plates and comprising a plurality of transverse top plates provided with edge slots; front and rear fulcrum rods extended respectively across said key housing and the main case just to the rear of the housing; key levers fulcrumed on said fulcrum rods and provided with downturned active arms and forward disposed motive arms; approximately vertically slidable key bars pivoted at their lower ends to said motive arms and carrying key buttons at the upper end; a carriage carrying setting members actuated by the active arms; punches set by said members; a die plate cooperating with the punches; and a magazine discharging upon the plate.

31. In combination, in a perforating machine, a key lever housing; actuating keys therein having active arms; anchor brackets fixed to the rear of said housing; flexible push cables having their outer members anchored in said bracket and their inner members engaged by said active arms; a plurality of pairs of connected horizontal actuating levers having horizontal slots; the outer ends of the levers on the side toward said key housing having an upturned lip receiving the inner member of said cables respectively whereby when the key levers are actuated the outer ends of said actuating levers are moved forwardly and said slots are moved rearwardly; a vertical series of actuating bars disposed transverse to the machine and operably connected to the slots of the actuating levers and a carriage carrying setting bars actuated by the actuating bars; punches set by said setting bars; a cage having a die plate cooperating with the punches; and a magazine discharging into the cage.

32. In combination, in a perforating machine, actuating means; transverse actuating bars actuated by said means; a transversely movable carriage; setting bars on the carriage and actuated by the actuating bars for any position of the carriage; an escapement mechanism actuated by said setting bars; punches set by said setting bars; and a cage having a die plate cooperating with the punches.

33. In combination, in a perforating machine, actuating keys; intermediately fulcrumed flat horizontal actuating levers arranged transversely of the machine, in pairs one above the other and having their inner ends loosely connected; the outer ends of the levers of one side being actuated by said keys whereby when the keys are actuated the outer ends of said actuating levers are moved forwardly and the inner ends are moved rearwardly; transverse actuating bar associated with each pair of actuating levers; means connecting said bars to said inner ends; a transversely movable carriage; setting bars on the carriage and actuated by the actuating bars; punches set by said bar members; and a die plate cooperating with the punches.

34. In combination, in a perforating machine, actuating means; parallel actuating bars actuated by said means; a carriage movable in a path parallel to said bars; setting members on the carriage and actuated by the actuating bars; punches set by said members; and a die plate cooperating with the punches.

35. In combination, in a perforating machine, a casing having side plates; actuating keys thereon; vertically disposed pivot rod brackets fast on the inner faces of said side plates and having inturned arms; vertical pivot rods mounted in said arms; flat horizontal actuating levers intermediately fulcrumed on said pivot rods and arranged transversely of the machine, in pairs one above the other and having their inner ends loosely connected by a slot and tongue connection, each lever having a longitudinal slot in its inner arms; means whereby the outer arms of the actuating levers are actuated by the key levers; an actuating bar associated with each pair of actuating levers and extending approximately from side to side of the machine and having an upturned actuating flange and frontwardly disposed end guides and intermediate guides; stud rivets connecting said intermediate guides to said longitudinal slots whereby said guides are held in guided relation; a carriage carrying setting members actuated by the bars; punches set by said setting members; and a die plate cooperating with the punches.

36. In combination, in a perforating machine, a casing having side plates; transverse actuating bars; a carriage guide bar disposed between said side plates; a fixed V-rail mounted between said side plates; balls disposed in said rail; a movable inverted V-shaped carriage rail resting on said balls; means moving the carriage rail in one direction step-by-step; a vertical carriage frame on said carriage rail and touching the front face of said carriage guide bar and there bent frontwardly to form a horizontal top plate; a retaining piece fast on said top plate and engaging over said guide bar, whereby the frame plate is held against forward movement; setting members carried by the carriage frame and actuated by the actuating bars; punches set by said members; a cage having a die plate cooperating with the punches; and a magazine discharging into the cage.

37. In combination, in a perforating machine, actuating keys; a carriage; a pulley wheel mounted at the side of the machine; a ribbon secured to the carriage and passed over said wheel; a spring tensioned between the free end of said ribbon and the side of the machine whereby said carriage is yieldably drawn; setting bar members on said carriage actuated by the keys; punches set by said bar members; and a die plate cooperating with the punches.

38. In combination, in a perforating machine, a casing having side plates; actuating keys; transverse actuating bars actuated by the keys; a transversely movable carriage comprising a carriage rail; setting bars on the carriage and actuated by the actuating bars; an escapement mechanism for said carriage; a pulley wheel mounted outside of one side plate; a metallic ribbon secured to the movable rail and passed through openings in said side plate and over said wheel; a spacing or feed spring tensioned between the free end of said ribbon and another side plate whereby said carriage rail is yieldably drawn in one direction; settable punches set by the setting bars; a cage having dies cooperating with the punches; a magazine discharging into the cage.

39. In combination, in a perforating machine, a plurality of key levers; a vertical series of actuating bars disposed transversely to the machine and operatively connected with the key levers and actuated rearwardly by depression of the key levers; a carriage yieldably movable transversely of the machine to the rear of said bars; a vertical series of horizontal setting bars arranged longitudinally of the machine and yieldably actuatable rearwardly by said actuating bars; punches settable by said setting bars; and dies cooperating with the punches.

40. In combination, in a perforating machine, a plurality of key levers; a vertical series of actuating bars disposed transverse to the machine and operably connected with the key levers; a carriage yieldably movable transversely of the machine of the rear of said bars and having top and bottom plates and a vertical frame plate provided with openings; a vertical escapement or feed shaft pivoted in said top and bottom plates; a vertical series of setting bars disposed adjacent to and perpendicular to said actuating bars and passing through said openings; retracting supporting levers intermediately fulcrumed on and relative to said escapement shaft and having one arm pivotally supporting and guiding the front end of said setting bars respectively; settable punches; a cage having dies cooperating with the punches; and a magazine discharging into the cage.

41. In combination, in a perforating machine, actuating keys; a carriage carrying setting bars actuated by the keys; a die plate cooperating with the punches; and a magazine discharging onto the die plate; a punch housing formed of front and rear guide plates provided with alined guide perforations; settable punches disposed in said guide perforations respectively and engageable by said setting bars to be yieldably pressed rearwardly and each having an enlarged butt portion normally abutting said front plate and provided in its top edge with a rectangular notch and an oblong notch forming therebetween a triangular projection formed with an inclined advance edge and an abrupt butt edge; latches engageable with said butt edge to hold set punches set; a grid engageable with said latches; and means operated for actuating said grid.

42. In combination, in a perforating machine, actuating means; a transversely movable carriage; setting means on the carriage and actuated by the actuating means; a card cage comprising a die plate having perforations; columns of settable punches engageable by said setting means and alined with said perforations and each provided with a triangular projection having an abrupt butt edge; and yieldably depressed vertical latches between said columns and provided with abutments adapted to rise and engage said butt edges.

43. In combination, in a perforating machine, actuating keys; a carriage carrying setting bars actuated by the keys; a card cage comprising a die plate having perforations; columns of punches cooperating with the perforations and settable by said setting bars and having projections forming inclined advance edges and abrupt butt edges; a vertically movable latch disposed between said columns and projecting above the punches and each provided in its top with a lateral recess, and intermediately with recesses forming lateral abutments normally in advance of said advance edges and engageable by said advance edge as the punch is moved rearwardly to set position under the section of the setting bar thereby to raise the bar to permit the latch to snap against said butt edge to hold the punch set; a fulcrum rod disposed across the machine frontward of and slightly above said latches; notched levers disposed in said lateral recesses and fulcrumed on said fulcrum rod; a bar below said L-levers; and springs tensioned between the notches and said bar.

44. In combination, in a perforating machine, a card cage comprising a guide plate and a die plate provided with alined perforations; columns of settable punches alined with said perforations and each provided with a triangular projection having an abrupt butt edge, vertical latches between said columns and provided with abutments adapted to rise and engage said butt edges when a punch is pushed forward; a fulcrum rod disposed across the machine frontward of and slightly above said latches; L-levers having oblong rearwardly disposed notched arms disposed in said lateral recesses, and upturned arms intermediately fulcrumed on said fulcrum rod; a bar across the machine below said arms; and springs tensioned between the notch of the notch arms and said bar whereby the latches are yieldably held depressed; means for setting the punches; and means for actuating the set punches.

45. In combination, setting bars; a cage having die perforations; columns of settable punches engageable by said setting bars and alined with said perforations and each provided with a triangular projection having an abrupt butt edge; vertical latches between said columns and provided with abutments adapted to rise and engage said butt edges when a punch is pushed forward; levers connected to said latches; interposing pieces pivoted to said levers and adapted to be moved from inactive position lying on the L-levers to active position; a movable locking bar adapted to lock the pieces in inactive position and prevent the rise of the levers and latches.

46. In combination, in a perforating machine, a casing having side plates; columns of settable punches therein; each provided with a triangular projection having an abrupt butt edge, means for setting the punches; dies cooperating with the punches; vertical latches between said columns and provided with abutments adapted to rise and engage behind said butt edges when a punch is pushed forward; L-levers connected to said latches and comprising long arms and upturned arms; interposing pieces pivoted on the upper ends of said upturned arms and adapted to rest on said long arms when the pieces are turned back; locking bar brackets mounted on said side plates; stud screws in the top face of said brackets; a locking bar disposed across the machine on said top faces and provided with parallel slots diagonal to the axis of the bar whereby, the bar may be moved rearwardly but still held parallel to its normal axis; and a spring yieldably holding the locking bar forwardly over said interposing pieces.

47. In combination, in a perforating machine, a carriage; setting members thereon; punches set by said bar members; a cage having a die plate cooperating with the punches; latches to hold said punches set; levers connected to said latches; interposing pieces pivoted to said levers and adapted to be moved from inactive to active position; and a restoring roller on the carriage movable to position to engage the active positioned pieces, thereby to raise the latches.

48. In combination, in a perforating machine, a die having perforations; a carriage; setting bars thereon; columns of settable punches engageable by said setting bars and alined with said perforations and each provided with a triangular projection having an abrupt butt edge; vertical latches between said columns and provided with abutments adapted to rise and engage said butt edges when a punch is pushed forward; T-levers connected to said latches; interposing pieces pivoted to said levers and adapted to be moved from inactive position lying on the L-levers to active position; a movable locking bar adapted to lock the pieces in inactive position and prevent the rise of the L-levers and latches; and a restoring roller on the carriage movable to position to engage the active positioned pieces, thereby to raise the latches.

49. In combination, in a perforating machine, actuating keys; a movable carriage carrying setting bars settable by said keys; a card cage comprising a die plate having perforations; punches cooperating with the perforations and settable by said setting bars; latches to hold set punches set; L-levers connected to said latches and having upturned arms; interposing pieces pivoted to said arms and adapted to be moved from inactive position lying on the L-levers to active position forward of the upturned arm; a restoring shaft mounted in said carriage; a restoring arm fast on the upper part of the shaft; a vertical restoring roller mounted on the end of said arm; a restoring handle lever fast on the lower end of the restoring shaft and adapted to be manually moved to restore the carriage and to rock said restoring shaft thereby to move said roller rearwardly and against the downwardly positioned interposing pieces thereby to press the pieces rearwardly to raise the L-levers and the latches to release the set punches.

50. In combination, in a perforating machine, a casing having side plates; actuating keys; a carriage carrying members actuated by the keys; punches set by said members; a cage having a die plate cooperating with the punches; a one-revolution shaft; eccentrics on said shaft; an electric motor; a clutch shaft clutched to the motor shaft and provided with a small pinion; an idler shaft carrying a small gear and a larger gear meshing with said pinion; a main shaft extended across and through the machine and carried in ball bearings in said side plates and operatively connected to one revolution shaft and larger gear; a magazine discharging into the cage and having a picker; and means connected to said eccentrics for operating said picker and the set punches.

51. In combination, settable punches; a cage having dies cooperating with the punches; a continuously rotary member; a main shaft; a one-revolution clutch between said member and main shaft; manual means for tripping said clutch; a magazine discharging into the cage and having a picker; and means for operating said picker and the set punches.

52. In combination, in a perforator, an operating means comprising a main shaft; a continuously rotary gear loosely mounted on said shaft and provided with a clutch sleeve provided with a recess; a pawl disk fast on said main shaft; a pawl carried on said disk and adapted to be yieldably pressed into engagement with said recess; a one-revolution shaft operating said operating means and geared to said main shaft at an even reducing ratio and provided near said pawl with an axial bore and a transverse end notch; a plunger pin in said bore; a spring compressed between the pin and the inner end of the bore; a detent arm fast across the outer end of the pin and slidable in said slot and engageable with the tail of said pawl, when the pin is in outward position, to hold the pawl from the clutch recess; and means for pressing the pin inward.

53. In combination, in a perforating machine, a casing having side plates; actuating keys; flexible cables actuated by said keys; a carriage carrying members actuated by the cables; punches set by said members; a cage having a die plate cooperating with the punches; a magazine discharging into the cage and having a picker; means for operating said picker and the set punches comprising a rotary sleeve having a recess; a main shaft carrying a pawl; a one-revolution shaft having a yieldably outwardly pressed axial pin; a detent arm on said pin; and a tripping lever intermediately fulcrumed on one of said side plates and having its active arm engaging said pin of the detent arm and having its motive arm engageable by the inner member of the flexible cables, whereby actuation of the keys presses inward the detent arm and permits the pawl to engage in the recess and be revolved until the one-revolution shaft has made a complete revolution, whereupon the detent arm engages the tail of the pawl and disengages the pawl from the recess and permits the one-revolution shaft to come to rest.

54. In combination, settable punches; a cage having dies cooperating with the punches; a magazine discharging into the cage; a follower in said magazine adapted to press against said cards; a follower link pivoted to said follower and extended rearwardly and downwardly; a spring tensioned between the follower link and said die plate for yieldably forcing the cards forward; and a main fulcrum rod pivotally receiving the lower end of the follower link.

55. In combination, settable punches; a cage having dies cooperating with the punches; a magazine having an adjustable throat at its forward end over said cage; a vertically movable picker bar at the forward end of said magazine and having a picker knife over the throat; thin vertical retaining bars secured edge forward on the lower face of the picker bar and against which the cards are pressed; a main fulcrum rod below the rear of the magazine; a follower in the magazine and having a back pressed central ear; a follower link pivoted to said ear and extended rearwardly and downwardly and received on said rod; a spring tensioned between the follower link and said die plate for yieldably forcing the cards forward; and means for actuating the picker bar and punches.

56. In combination, in a perforating machine, actuating keys; a carriage carrying members actuated by the keys; punches set by said members; a vertical cage having a die plate cooperating with the punches; a magazine discharging into the cage and having a picker; upper and rear feed roll shafts disposed above and to the rear of said cage; idler shafts; upper and rear friction rolls on said shafts respectively for receiving cards from the magazine and conveying them to and through the cage; pinions on said shafts and idlers on said idler shafts driven from said continuously rotary gear for rotating said friction rolls; means comprising an intermediately rotated member for operating said picker, the set punches and said shafts.

57. In combination, in a perforating machine, actuating keys; a carriage carrying members actuated by the keys; punches set by said members; a cage having a die plate cooperating with the punches; supporting bars disposed across the machine above the level of the top of said cage; an adjustable throat knife, and side and intermediate supports on said bars, on which cards to be perforated rest edgewise and face forward; side guide plates secured to the side supports; said knife being provided with a knife edge at the forward end and a slot in its lower rear face receiving the head of an adjusting screw carried in the rear supporting bar; a throat plate forward of said knife and obscuring only a small portion of the front card and cooperating with the knife to form a throat; a plate supporting bar disposed across the machine and supporting said throat plate; a picker above said throat; and means for operating said picker and the set punches.

58. In combination, settable punches; a cage having dies cooperating with the punches; a magazine having a throat over said cage; a vertically movable picker bar at said throat and having a picker knife over the throat; upright bars secured to the end of the picker bar; fulcrum rods to the rear of the magazine; levers connecting said rods and uprights; and means connected to said levers for operating said picker.

59. In combination, in a perforating machine, setting means; punches set by said means; a cage having a die plate cooperating with the punches; a magazine having an adjustable throat at its forward end over said cage; upper and lower pairs of picker-supporting levers pivoted to said rod links of each pair being superposed on the outer side of said guide plates; vertical picker supporting uprights pivoted for vertical movement at the forward end of each pair of superposed levers; a picker bar mounted upon the upper ends of the uprights and means for reciprocating said supporting levers.

60. In combination, in a perforating machine, actuating keys; a carriage carrying members actuated by the keys; punches set by said members; a cage having a die plate cooperating with the punches; a magazine discharging into the cage and having side guide plates; a pair of fulcrum rods disposed across the machine to the rear of said guide plates; upper and lower pairs of picker-supporting levers pivoted to said rods, links of each pair being superposed on the outer side of said guide plates; vertical picker supporting uprights pivoted for vertical movement at the forward end of each pair of superposed levers; a picker bar mounted upon the upper ends of the uprights; means for operating said picker bar and the set punches comprising a shaft; eccentrics on the shaft; and upturned eccentric links received on said eccentrics and connected to said lower levers.

61. In combination, settable punches; a cage having dies cooperating with the punches; a main shaft; a rotary member; a one-revolution clutch between said member and main shaft; manual means for tripping said clutch; a magazine having an adjustable throat at its forward end over said cage; a vertically movable picker bar at the forward end of said throat and having an upturned front flange having tapped openings; a picker blade adjustably mounted on the picker bar and slightly projecting at the rear and provided with longitudinal slots; headed adjusting screws in said tapped openings and having heads engaged in said slots; thin vertical bars secured edge forward on the lower face of the picker bar and against which the cards are pressed; a main fulcrum rod to the rear of the main shaft; levers thereon supporting the picker bar; eccentrics on the main shaft; and means for reciprocating the picker bar comprising upturned eccentric links received on said eccentrics and connected to said levers.

62. In combination, settable punches; a cage having dies cooperating with the punches; a continuously rotary member; a main shaft; a one-revolution clutch between said member and main shaft; manual means for tripping said clutch; a magazine having its throat disposed toward the front discharging into said cage; means for holding the forward card with its face visible at said throat; a picker for said forward card; levers supporting said picker; a pair of eccentrics on said main shaft; and eccentric links received thereon at the lower end and having a slot and pin connection with the mid part of the lower picker supporting levers, whereby on each revolution of the main shaft, the picker is reciprocated downwardly and back once, thereby to project a card downwardly from the throat.

63. In combination, punches; a cage having dies cooperating with the punches; a magazine having a picker for discharging into the cage; means comprising eccentrics and eccentric links for reciprocating the picker; a main fulcrum rod; T-levers pivoted on the main fulcrum rod and having forward and lower arms; means connecting the lower arms with the gate; links connecting the forward arms with the gate; links connecting the forward arms with the eccentric links for rocking the T-levers; a horizontal card gate slidable at the lower part of said cage and provided at the rear end with downturned ears having horizontal slots disposed under said main fulcrum rod; and a shift bar carried by said lower arms and receiving said horizontal slots thereon, whereby the card gate is reciprocated as the T-lever rocks.

64. In combination, punches; a cage having dies cooperating with the punches; a magazine discharging into the cage; a picker for the magazine; a shaft; eccentrics thereon; means for reciprocating the picker and comprising eccentric links reciprocated by said eccentrics; a fulcrum rod; a card gate at the bottom of the cage; levers pivoted on the main fulcrum rod and having forward and lower arms; means connecting the lower arms with the gate; and links connecting the forward arms with the eccentric links for rocking the T-levers.

65. In combination, settable punches; a cage having dies cooperating with the punches; a magazine discharging into the cage; a fulcrum rod; a card gate at the bottom of the cage; T-levers pivoted on the fulcrum rod and having upper, forward and lower arms; means connecting the lower arms with the gate; means connected to the upper arms for operating set punches; and means connected to the forward arms for rocking the T-levers.

66. In combination, settable punches; a cage having dies cooperating with the punches; a magazine discharging into the cage; a picker for the magazine; a shaft; eccentrics thereon; means for reciprocating the picker and comprising eccentric links reciprocated by said eccentrics; a fulcrum rod; a card gate at the bottom of the cage; T-levers pivoted on the main fulcrum rod and having upper, forward and lower arms; means connecting the lower arms with the gate; means connected to the upper arms for operating set punches; and links connecting the forward arms with the eccentric links for rocking the T-levers.

67. In combination, punches; a cage having dies cooperating with the punches; a gate on said cage; a magazine discharging into the cage; a picker for the magazine; a shaft; eccentrics thereon; means for reciprocating the picker and comprising eccentric links reciprocated by said eccentrics; and means for operating said gate and the set punches comprising a lever and links connecting the lever with the eccentric links.

68. In combination, settable punches; a cage having dies cooperating with the punches; a magazine discharging into the cage and having a picker bar; eccentrics on the main shaft; means for reciprocating the picker bar comprising upturned eccentric links received on said eccentrics; a main fulcrum rod to the rear of the main shaft; T-levers pivoted on the main fulcrum rod and having forward arms; reciprocatory links pivoted at the upper ends to the upper part of said eccentric links and at the lower part to said forward arms, whereby the T-lever is rocked as the picker is reciprocated; and means operated by said T-levers for actuating said punches.

69. In combination, a magazine; a picker bar for said magazine; a card cage comprising a die plate having perforations; a gate on said cage; punches cooperating with the perforations and settable by said setting bars; latches to hold said punches set; a grid engageable with said latches; means for actuating said picker, gate and grid; and a receptacle beneath said gate.

70. In combination, a bank of settable punches; latches to hold said punches set; a cage having dies cooperating with the punches; guide rods slidable on each side of the bank of punches; and means supported by the forward ends of said guide rods and engaging behind said latches for actuating the punches.

71. In combination, in a perforating machine, settable punches; vertical latches to hold set punches set; a cage having a die plate cooperating with the punches; a magazine discharging into the cage; a main fulcrum rod extending across the machine to the rear; levers on said rod having upturned arms; guide sleeves mounted in and projecting through said cage; guide rods slidable in said sleeves and provided with front and rear vertical end slots; draft links pivoted in said rear end slots and to said upturned arms of the levers; bifurcated guide supports fast in said front slots and having forwardly projecting upper and lower arms; a grid supported by the forward ends of said guide rods and comprising force plates engaging before and behind said vertical latches; and means for rocking the levers.

72. In combination, in a perforating machine, actuating keys; a carriage; setting bars thereon actuated by the keys; a bank of columns of settable punches engageable by said setting bars and alined with said perforations and each provided with a triangular projection having an abrupt butt edge; vertical latches between said columns and provided with abutments adapted to rise and engage said butt edges; guide rods slidable on each side of the bank of punches; a grid supported by the forward ends of said guide rods and comprising force plates engaging before and behind said vertical latches; and means for operating said rods and therefore the set punches.

73. In combination, columns of settable punches each provided with a triangular projection having an abrupt butt edge, vertical latches between said columns and provided with abutments adapted to rise and engage said butt edges when a punch is set; a cage having dies cooperating with the punches; a magazine discharging into the cage; guide rods slidable on each side of the punches and having forward upper and lower arms; means for drawing the guide rods rearwardly; upper and lower bar supports mounted between said arms and disposed above and below the columns of punches; vertical rods carried by said cross supports between said columns on both sides of the plane of the latches; spacing collars on said rods; and horizontal force plates provided with perforations received on said rods and spaced by said collars engaging on both sides of said latches whereby when the guide rods are drawn rearwardly said latches are drawn rearwardly and press against the abrupt faces of set punches and force the punches through a card in the cage into the die perforations of the die plate.

74. In combination, settable punches; a cage having dies cooperating with the punches; a magazine discharging into the cage; a receptacle bottom plate having an upturned flared receiving wall approximately under said cage: a yieldable vertical follower slidably disposed on said bottom plate and formed with a tongue slidable beneath said bottom plate; and a spring tensioned between said bottom plate and tongue.

75. In combination, in a perforating machine, settable punches; a cage having dies cooperating with the punches; a magazine discharging into the cage; a tie rod and a supporting rod passed across the lower part of the machine; a receptacle bottom plate having an upturned flared receiving wall approximately under said cage, a downpressed rear ear, parallel longitudinal guide slots, and downturned side flanges provided with holes receiving said supporting tie rods; a yieldable vertical follower slidably disposed on said bottom plate; a tongue slidable beneath said bottom plate and having a downturned forward end and upturned rear ears passing through said slots and secured to the follower; a spring tensioned between said ear and downturned ear; and friction rollers on said continuously rotary shaft for positioning the cards ejected from said cage.

76. In a machine of the class described, a series of settable pins arranged in rows, a series of latches, one for each row, means for selectively moving the pins to set position where they are retained by said latches and means for moving the latches relatively to the supporting frame work positively to operate the set pins.

77. In a machine of the class described, a card magazine having a picker knife associated with one end thereof for feeding cards from the magazine, perforated plates having means therein for operating upon the cards, an actuator for said operating means connected to said picker knife for actuating said knife once for each operation of the operating means, said card magazine having said end adjacent the picker knife open, exposing the cards to view.

78. In a machine of the class described, a card magazine having an open front for exposing to view cards arranged therein, a picker knife adjacent said open front for removing the exposed card during each operation of the picker knife, perforated plates having punches projectable through the perforations therein for operating upon the cards, an actuator for said punches connected to said picker knife for operating said knife once for each operation of said punches and a key board positioned in said machine at the side of said magazine which includes said open front in such a position that the entire length and width of the cards exposed in said front will be legible to the operator of said key board.

79. In a machine of the class described, a card magazine having an open front for exposing to view cards arranged therein, card feeding means adjacent said opening for removing the exposed card, punching means, and operating mechanism operating through a cycle in which the exposed card is first fed to the punching means and then punched.

80. In a machine of the class described, a card magazine having an open front for exposing to view cards arranged therein, card feeding means adjacent said opening for removing the exposed card during each operation thereof, punching means for said cards arranged in alignment with said feeding means, set-up mechanism for the punches operable from the side of the machine on which the open front of said magazine is exposed, and an operator for said feeding means and punching means arranged to operate the feeding means to feed a card from said open front into said punching means and there punch it according to the set-up made while said card was visible in said card magazine.

81. In a machine of the class described, stationary supporting plates, a plurality of similar rows of slidable elements 86 arranged in said plates, a single row of slidable operating members 82 arranged parallel to said rows of slidable elements and mounted on a carriage for movement in a direction at right angles to said rows of slidable elements, a plurality of bars mounted for movement toward and away from said operating members and positioned parallel to the direction of movement of said carriage, means for operating said bars to project them against said operating members to cause the latter to operate upon a single row of slidable elements at a time, and stepping means for said carriage.

WILLIAM W. LASKER.